United States Patent
Kano et al.

(10) Patent No.: US 9,548,495 B2
(45) Date of Patent: Jan. 17, 2017

(54) NONAQUEOUS ELECTROLYTE BATTERY

(71) Applicant: Kabushiki Kaisha Toshiba, Minato-ku (JP)

(72) Inventors: Tetsuro Kano, Kashiwazaki (JP); Hikaru Yoshikawa, Kashiwazaki (JP); Hidesato Saruwatari, Kashiwazaki (JP); Kazuya Kuriyama, Saku (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 186 days.

(21) Appl. No.: 14/478,043

(22) Filed: Sep. 5, 2014

(65) Prior Publication Data

US 2015/0079470 A1    Mar. 19, 2015

(30) Foreign Application Priority Data

Sep. 18, 2013 (JP) .................................. 2013-193546
Sep. 2, 2014 (JP) .................................. 2014-178325

(51) Int. Cl.
  *H01M 4/62* (2006.01)
  *H01M 4/13* (2010.01)
  (Continued)

(52) U.S. Cl.
  CPC ............ *H01M 4/625* (2013.01); *H01M 4/0404* (2013.01); *H01M 4/131* (2013.01); *H01M 4/485* (2013.01); *H01M 4/505* (2013.01); *H01M 4/525* (2013.01); *H01M 4/623* (2013.01); *H01M 10/052* (2013.01);
  (Continued)

(58) Field of Classification Search
  CPC .... H01M 4/0404; H01M 4/131; H01M 4/485; H01M 4/505; H01M 4/525; H01M 4/623; H01M 4/625; H01M 10/052
  See application file for complete search history.

(56) References Cited

U.S. PATENT DOCUMENTS

| | | | |
|---|---|---|---|
| 2009/0280411 A1* | 11/2009 | Ohira | H01M 4/131 429/221 |
| 2010/0216027 A1* | 8/2010 | Fujii | H01G 9/016 429/246 |
| 2013/0288121 A1* | 10/2013 | Nagai | H01M 4/13 429/211 |

FOREIGN PATENT DOCUMENTS

| | | |
|---|---|---|
| CN | 1348231 A | 5/2002 |
| CN | 1947281 A | 4/2007 |

(Continued)

OTHER PUBLICATIONS

Kim et al. "LiNi0.4Co0.3Mn0.3O2 thin film electrode by aerosol deposition", Nano Research Letters 7:64, 2012, p. 1-6.*

(Continued)

*Primary Examiner* — Kenneth Douyette
(74) *Attorney, Agent, or Firm* — Oblon, McClelland, Maier & Neustadt, L.L.P.

(57) ABSTRACT

According to one embodiment, there is provided a nonaqueous electrolyte battery. The nonaqueous electrolyte battery includes a positive electrode, a negative electrode, and a nonaqueous electrolyte. The positive electrode includes a positive current collector and a positive electrode material layer formed on the positive electrode current collector. The positive electrode material layer includes a positive electrode active material and a first conductive agent. In a mapping image for the positive electrode material layer, a ratio of an occupancy area of the first conductive agent to an occupancy area of the positive electrode active material is from 1.5 to 5.

13 Claims, 3 Drawing Sheets

(51) Int. Cl.
  *H01M 4/50* (2010.01)
  *H01M 4/131* (2010.01)
  *H01M 4/505* (2010.01)
  *H01M 4/485* (2010.01)
  *H01M 4/525* (2010.01)
  *H01M 10/052* (2010.01)
  *H01M 4/04* (2006.01)
  *H01M 4/02* (2006.01)
  *H01M 4/1391* (2010.01)
  *H01M 10/0525* (2010.01)

(52) U.S. Cl.
  CPC ...... *H01M 4/1391* (2013.01); *H01M 10/0525* (2013.01); *H01M 2004/021* (2013.01); *H01M 2300/0037* (2013.01); *Y02E 60/122* (2013.01)

(56) References Cited

FOREIGN PATENT DOCUMENTS

| | | |
|---|---|---|
| CN | 103283067 A | 9/2013 |
| JP | 2003-168434 | 6/2003 |
| WO | WO-2012/063370 A1 * | 5/2012 ............. H01M 4/13 |

OTHER PUBLICATIONS

Extended European Search Report issued Jan. 22, 2015 in Patent Application No. 14183716.1.

Marie Kerlau et al., Reprint of "Studies of Local Degradation Phenomena in Composite Cathodes for Lithium-ion Batteries", Electrochimica Acta, vol. 53, No. 3, XP022453618, Oct. 24, 2007, pp. 1385-1392.

Robert Kostecki* et al., "Local-Probe Studies of Degradation of Composite $LiNi_{0.8}Co_{0.15}Al_{0.05}O_2$ Cathodes in High-Power Lithium-Ion Cells", Electrochemical and Solid•State Letters, vol. 7, No. 10, XP055161540, Sep. 27, 2004, pp. A380-A383.

Jan-Christoph Panitz et al., "Raman Microscopy as a Quality Control Tool for Electrodes of Lithium-ion Batteries", Journal of Power Sources, vol. 97-98, XP004254476, Jul. 1, 2001, pp. 174-180.

* cited by examiner

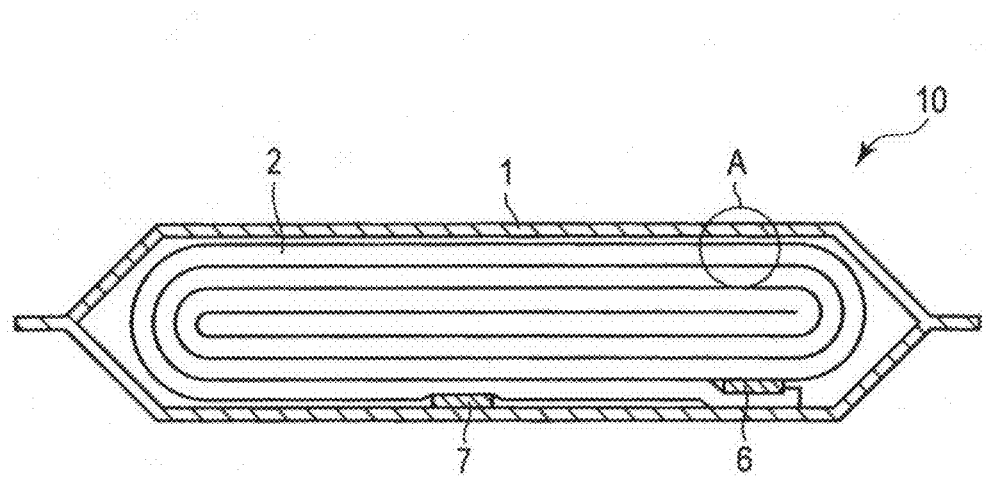
F I G. 1
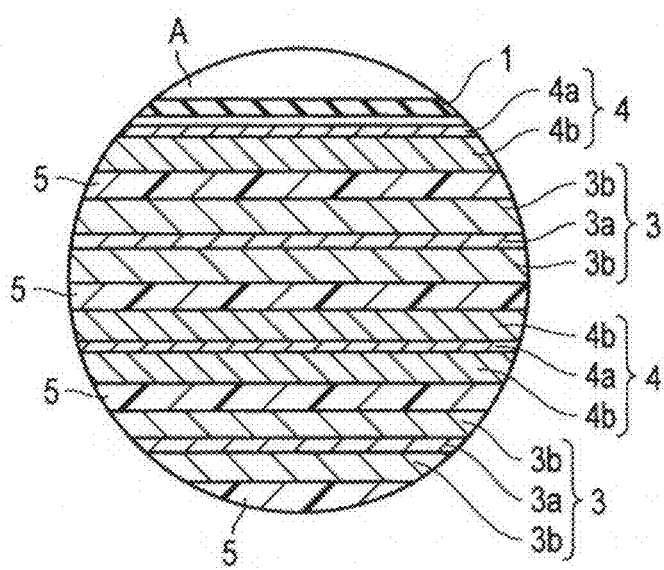
F I G. 2

NONAQUEOUS ELECTROLYTE BATTERY

CROSS-REFERENCE TO RELATED APPLICATIONS

This application is based upon and claims the benefit of priority from the Japanese Patent Applications No. 2013-193546, filed Sep. 18, 2013; and No. 2014-178325, filed Sep. 2, 2014, the entire contents of all of which are incorporated herein by reference.

FIELD

Embodiments described herein relate generally to a nonaqueous electrolyte battery.

BACKGROUND

When a capacity of a nonaqueous electrolyte battery is increased, it is necessary to use an active material having a high capacity such as a compound having a high Ni content among lithium-containing nickel-cobalt-manganese composite oxides, to increase a density of an electrode, and to decrease an amount of auxiliary members in an electrode-mixture.

When the measures described above are carried out, however, though the increase of an energy density can be expected, a crystal structure of the active material is easily deteriorated, an electrical conduction network is insufficiently formed in an electrode-mixture layer to cause deviation in resistance distribution, low porosity of the electrode member layer and high likelihood of deviation in Li ion concentration, thus resulting in occurrence of a risk that long-term properties such as a cycle property is decreased.

It is required, accordingly, to find an electrode structure (a composition, a density, and an existential state of components) having both of a high energy density and an excellent cycle property.

BRIEF DESCRIPTION OF THE DRAWINGS

FIG. 1 is a schematic cross-sectional view showing one example of a nonaqueous electrolyte battery according to an embodiment;

FIG. 2 is an enlarged cross-sectional view showing a part A of the nonaqueous electrolyte battery shown in FIG. 1;

DETAILED DESCRIPTION

Figure 3:
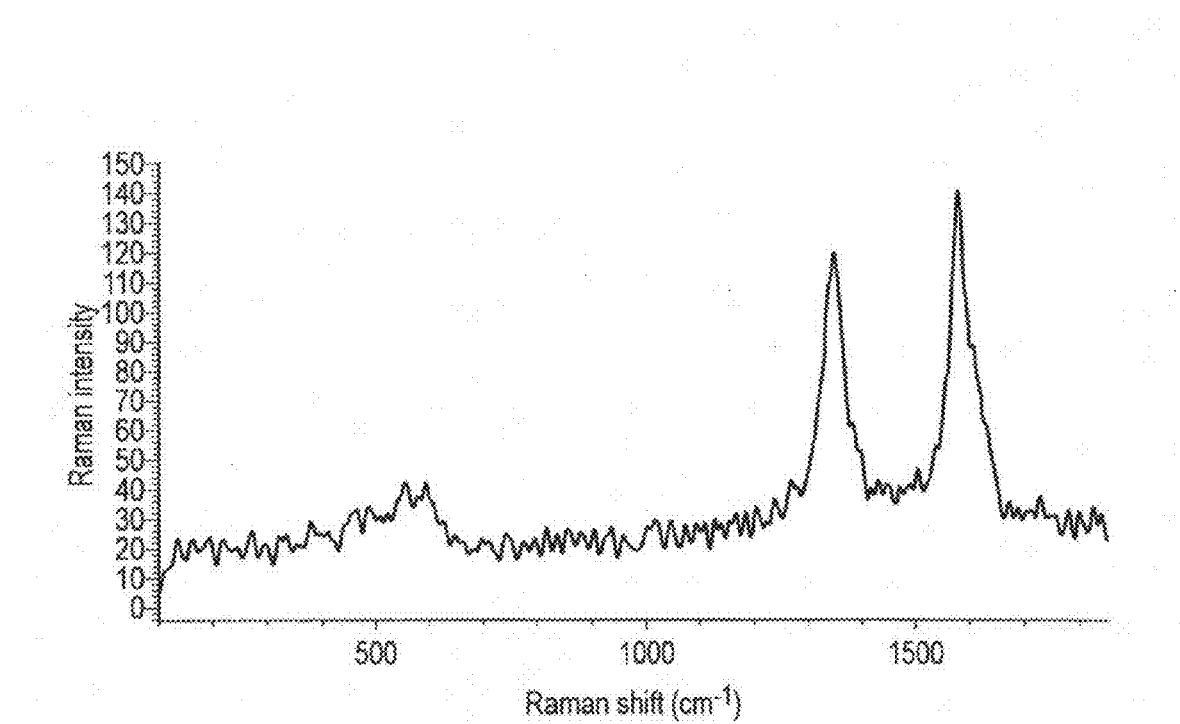
FIG. 3 is a Raman chart of a part of a positive electrode material layer in a nonaqueous electrolyte battery from Example 1.

In general, according to one embodiment, there is provided a nonaqueous electrolyte battery. The nonaqueous electrolyte battery includes a positive electrode, a negative electrode, and a nonaqueous electrolyte. The positive electrode includes a positive current collector and a positive electrode material layer formed on the positive electrode current collector. The positive electrode material layer includes a positive electrode active material and a first conductive agent. The first conductive agent has a D-band appearing at $1350 \pm 10$ cm$^{-1}$ and a G-band appearing at $1590 \pm 10$ cm$^{-1}$ in a Raman chart obtained according to Raman spectroscopy. A ratio of an integrated intensity of the D-band to an integrated intensity of the G-band is more than 0.6 and not more than 10. In a mapping image, a ratio of an occupancy area of the first conductive agent to an occupancy area of the positive electrode active material is from 1.5 to 5. The mapping image is obtained using the Raman spectroscopy for the positive electrode material layer.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

In the positive electrode material layer, when a deviation in resistance distribution is caused, a deviation in utilization rate of an active material is also caused. In a part having a higher utilization rate in the positive electrode active material, a deterioration speed is relatively increased compared to a part having a lower utilization rate. This leads to deterioration of a capacity of a battery in cycles, which is one factor that reduces the cycle property. It can be considered that the resistance distribution particularly depends on a distribution state of a conductive agent in the positive electrode material layer. It is accordingly required that a distribution state of the components of the positive electrode material layer is optimum.

In a mapping image of the components of the positive electrode material layer, obtained using Raman spectroscopy, distribution states of the positive electrode active material and the first conductive agent are directly reflected. In the nonaqueous electrolyte battery according to the embodiment, the mapping image of the components satisfies the conditions described above, and thus, a high energy density can be exhibited and, at the same time, the distribution state of the first conductive agent near the positive electrode active material can be uniformized in the positive electrode material layer, whereby the resistance distribution can be uniformed in the positive electrode material layer. The reasons for this are described below.

First, the first conductive agent has a D-band appearing at around 1350 cm$^{-1}$ and a G-band appearing at around 1590 cm$^{-1}$ in a Raman chart obtained according to a Raman spectroscopy, and a ratio of an integrated intensity of the D-band to an integrated intensity of the G-band is more than 0.6 and not more than 10. The D-band and the G-band may vary in a width of about $\pm 10$ cm$^{-1}$ from the position described above. Such a first conductive agent may include, for example, carbonaceous materials having low crystallinity, such as carbon black including acetylene black, activated carbon, and carbon fiber. Substances having a ratio of the integrated intensity of the D-band to the integrated intensity of the G-band of more than 10 in the Raman chart, obtained according to the Raman spectroscopy, have too low a crystallinity, and thus they cannot be used as the conductive agent because electron conductivity, required for the conductive agent, cannot be secured.

When the first conductive agent is uniformly distributed in the positive electrode active material, the occurrence of the deviation of the utilization rate in the positive electrode active material can be prevented. The nonaqueous electrolyte battery according to the embodiment has a ratio of an occupancy area of the first conductive agent to an occupancy area of the positive electrode active material of 1.5 to 5, in a mapping image obtained according to Raman spectroscopy for the positive electrode material layer. The ratio in the occupancy area of 1.5 or more means that the area occupied by the first conductive agent is larger than the area occupied by the positive electrode active material, and it can be said that there is little deviation in the existential state of the first conductive agent and thus there is little aggregation. In the nonaqueous electrolyte battery according to the embodiment, accordingly, the first conductive agent can be more uniformly dispersed at a vicinity of the positive electrode active material where an oxidation-reduction reaction of Li ions proceeds in the positive electrode material layer, and an electronic conduction network can be sufficiently formed. This makes the nonaqueous electrolyte battery according to the embodiment able to prevent the occurrence of a deviation in the utilization rate of the positive electrode active material in the positive electrode material layer, to uniformize the resistance distribution in the positive electrode material layer, and consequently to exhibit an excellent cycle property.

The ratio of the occupancy area of the first conductive agent to the occupancy area of the positive electrode active material of less than 1.5 in the mapping image of the components means that the deviation in the existential state of the first conductive agent is large and the first conductive agent is aggregated in the positive electrode material layer. When the ratio in the occupancy area is less than 1.5, accordingly, a uniform electrical conduction network cannot be formed in the positive electrode material layer.

On the other hand, when the ratio of the occupancy area of the first conductive agent to the occupancy area of the positive electrode active material is more than 5 in the mapping image, an addition amount of the first conductive agent to that of the positive electrode active material is too large, and thus the energy density of the positive electrode decreases. The ratio of the occupancy area of the first conductive agent to the occupancy area of the positive electrode active material in the positive electrode material layer is preferably from 1.7 to 3.5. In such a case, a more uniform electrical conduction network can be formed in the positive electrode material layer, while a higher energy density can be attained.

In the mapping image of the components, a ratio of a distance of particles of the positive electrode active material to a distance between particles of the first conductive agent is preferably from 0.9 to 1.1. The distance of particles means a distance between most neighboring particles. A ratio close to 1 means that the distance between the particles of the positive electrode active material is close to the distance between the particles of the first conductive agent in the vicinity of the positive electrode active material. This means, accordingly, that in the positive electrode material layer having the ratio which is close to 1, the first conductive agent is more uniformly distributed in the vicinity of the positive electrode active material so that the positive electrode active material is covered with the first conductive agent. This enables the first conductive agent to form a more uniform electrical conduction network in the positive electrode material layer.

Preferably, the positive electrode material layer further includes a second conductive agent. The second conductive agent has a D-band appearing at around 1350 cm$^{-1}$ and a G-band appearing at around 1590 cm$^{-1}$ in the Raman chart obtained according to Raman spectroscopy, and a ratio of an integrated intensity of the D-band to an integrated intensity of the G-band of more than 0 and not more than 0.6. The D-band and the G-band may vary in a width of about ±10 cm$^{-1}$ from the position described above. Such a second conductive agent may include, for example, carbonaceous materials having high crystallinity, such as graphite and graphen. When the positive electrode material layer further includes the second conductive agent, the second conductive agent can further electrically connect the uniform electronic conduction networks, formed from the first conductive agent, to each other, whereby the occurrence of the deviation in the utilization rate of the positive electrode active material in the positive electrode material layer can be further prevented, and a better cycle property can be exhibited.

The positive electrode active material preferably includes at least one lithium-containing nickel-cobalt-manganese composite oxide of oxides represented by the general formula: $Li_yNi_{1-c-d}Co_cMn_dM_eO_2$. In the formula, it is preferably that $0.9 < y \leq 1.25$, $0 < c \leq 0.3$, $0 < d \leq 0.45$, or $0 \leq e \leq 0.1$. M is preferably at least one element selected from the group consisting of Mg, Al, Si, Ti, Zn, Zr, Ca, and Sn. Such a positive electrode active material can improve the energy density of the nonaqueous electrolyte battery.

Next, a method of obtaining the mapping image of the components of the positive electrode material layer using Raman spectroscopy is described.

First, a nonaqueous electrolyte battery to be tested is provided. Next, the battery provided is discharged to the lower limit voltage. Then, the nonaqueous electrolyte battery in the discharge state is opened in an inert atmosphere, and an electrode group is taken out from a battery container. Subsequently, a positive electrode is taken out from the electrode group taken out, and it is cut into a size necessary for measurement (about 15 mm×15 mm) to form a sample. The sample cut is washed with, for example, an ethylmethyl carbonate solvent to remove a lithium salt adhering thereto. The sample washed is dried in a reduced pressure to distill away the remaining solvent. The dried sample is put on a sample support such as a glass plate, which is loaded into a Raman spectroscopic device.

The loaded sample is subjected to surface Raman spectroscopy in a visual field of 50 μm×50 μm to obtain Raman charts. To obtain the Raman charts, measurements are performed at 1600 points by dividing the visual field of 50 μm×50 μm by 40 points in the longitudinal direction and 40 points in the transverse direction.

Next, using the Raman charts for 1600 points, average spectra are obtained. The average spectra are subjected to a multivariate analysis to separate significant spectrum components. As for the spectrum in each component separated, from a peak position, an intensity, and the intensity ratio, crystallinities of the positive electrode active material, the first conductive agent, and the second conductive agent (if contained) are evaluated.

A mapping of the existence ratio of each component is performed using the obtained spectrum of each component and the Raman charts concerning the 1600 points.

Note that the first conductive agent and the second conductive agent have the D-band and the G-band at similar points in the Raman chart, but the existence of the first conductive agent can be distinguished from the existence of the second conductive agent at that point by calculating a degree of overlapping by fitting, using a spectrum of the each agent.

The ratio of the existence ratios of the components can be depicted, for example, with the gradation of a color which is different at each component.

The ratio of the occupancy area of the first conductive agent to the occupancy area of the positive electrode active material, and the ratio in the distance between particles of the positive electrode active material to the distance between particles of the first conductive agent in the mapping image described above can be obtained by numerical analysis of the mapping data of the components as obtained above.

Next, a method of measuring an energy density of the positive electrode is described.

First, a nonaqueous electrolyte battery is opened, a positive electrode is taken out, and a sample is obtained from the positive electrode, as described above. Next, the sample is weighed. Then, a 3-electrode cell having the sample as a working electrode and lithium as a counter electrode and reference electrode is fabricated. The 3-electrode cell is subjected to the charge-and-discharge cycle, and a product of an average operating voltage obtained and a capacity of the positive electrode is defined as an energy. A (weight) energy density can be calculated by dividing the energy by a weight of the sample.

Next, a nonaqueous electrolyte battery according to an embodiment is described in detail.

The nonaqueous electrolyte battery according to the embodiment includes a positive electrode, a negative electrode, and nonaqueous electrolyte.

The positive electrode includes a positive electrode current collector, and a positive electrode material layer formed thereon.

The positive electrode current collector may be formed, for example, from a metal foil. As a material of the metal foil capable of forming the positive electrode current collector, for example, aluminum or an aluminum alloy may be used.

The positive electrode material layer may be formed on one side or both sides of the positive electrode current collector.

The positive electrode material layer includes a positive electrode active material and a first conductive agent.

The positive electrode active material may include one or more positive electrode active materials. The positive electrode active material may include, for example, various oxides, such as, the lithium-containing nickel-cobalt-manganese composite oxides described above, and lithium-containing cobalt oxides (e.g., $LiCoO_2$), manganese dioxide, lithium-containing manganese oxides (e.g., $LiMn_2O_4$, and $LiMnO_2$), lithium-containing nickel oxides (e.g., $LiNiO_2$), lithium-containing nickel-cobalt composite oxides (e.g., $LiNi_{0.8}Co_{0.2}O_2$), and lithium-containing iron oxides.

The positive electrode active material preferably includes the lithium-containing nickel-cobalt-manganese composite oxide, as described above.

As the first conductive agent, for example, carbon black or acetylene black, described above, may be used.

The positive electrode material layer may also include the second conductive agent described above. As the second conductive agent, for example, graphite or graphen, as described above, may be used.

The positive electrode material layer may further include a binder. The binder can be combined in order to fill up gaps of the positive electrode active material dispersed, and to bind the positive electrode active material to the positive electrode current collector.

As the binder, for example, polytetrafluoroethylene (PTFE), polyvinylidene fluoride (PVdF), modified PVdF in which at least one element of the hydrogen and fluoride elements in PVdF is substituted by another substituent, copolymers of vinylidene fluoride-hexafluoropropylene, or terpolymers of polyvinylidene fluoride-tetrafluoroethylene-hexafluoropropylene may be used.

The positive electrode may further include a positive electrode tab electrically connected to the positive electrode current collector. As the positive electrode tab, for example, a part of the positive electrode current collector where the positive electrode material layer is not formed on the surface thereof can be utilized. Alternatively, as the positive electrode tab, a member different from the positive electrode current collector may be used.

The positive electrode may be formed, for example, in the following method. First, a positive electrode active material, a first conductive agent, and arbitrarily a second conductive agent and a binder are added to a solvent, N-methylpyrrolidone, which is placed in a batch bead mill disperser. At that time, it is preferable to set a combination ratio of the positive electrode active material, the conductive agent (the first conductive agent and, optionally, the second conductive agent), and the binder to a range of 75 to 96% by mass of the positive electrode active material, 3 to 20% by mass of the conductive agent, and 1 to 7% by mass of the binder. Next, bead mill dispersion is performed in the bead mill disperser to obtain a positive electrode slurry. Then, the slurry as obtained above is applied on a positive electrode current collector. After that, the slurry applied is dried, and then is rolled, for example, using a roll press. Thus, the positive electrode including the positive electrode current collector and the positive electrode material layer formed on the positive electrode current collector can be obtained.

The distribution states of the positive electrode active material and the first conductive agent in the positive electrode material layer depend on, for example, the magnitude and the uniformity of the dispersion power applied to the positive electrode active material and the first conductive agent in the bead mill dispersion described above. For example, it is possible to control the dispersion states of the positive electrode active material and the first conductive agent in the positive electrode material layer so that the ratio of the occupancy area of the first conductive agent to the occupancy area of the positive electrode active material in the mapping image of the components, obtained by using the Raman spectroscopy, is adjusted to a range of 1.5 to 5, by controlling a bead diameter of the beads used in the bead mill dispersion, and a residence time (a dispersing time) and the number of rotations in the bead mill disperser.

The negative electrode may include a negative electrode current collector and a negative electrode material layer formed thereon.

The negative electrode current collector may be formed, for example, from a metal foil. As a material of the metal foil capable of forming the negative electrode current collector, for example, aluminum or an aluminum alloy may be used.

The negative electrode material layer may be formed on one side of both sides of the negative electrode current collector.

The negative electrode material layer may include a negative electrode active material, a negative electrode conductive agent, and a binder.

The negative electrode active material may include one or more negative electrode active materials. As the negative electrode active material, for example, metals, metal alloys, metal oxides, metal sulfides, metal nitrides, graphitized materials, carbonaceous materials, and the like, may be used. As the metal oxide, for example, substances including titanium, such as lithium-containing titanium oxide, may be used. The metal sulfide may include, for example, titanium sulfide such as $TiS_2$, molybdenum sulfide such as $MoS_2$, and iron sulfides such as FeS, $FeS_2$, and $Li_xFeS_2$. The graphitized material and the carbonaceous material may include, for example, natural graphite, artificial graphite, coke, vapor phase epitaxy carbon fibers, mesophase pitch carbon fibers, spherical carbon, carbon obtained by burning a resin, and the like.

As the conductive agent, which can be included in the negative electrode material layer, for example, carbon materials may be used. The carbon material may include, for example, acetylene black, carbon black, coke, carbon fibers, graphite, and the like.

As the binder, which can be included in the negative electrode material layer, the same binders as those used in the positive electrode material layer may be used.

The negative electrode may further include a negative electrode tab electrically connected to the negative electrode current collector. As the negative electrode tab, for example, a part of the negative electrode current collector where the negative electrode material layer is not formed on the surface thereof can be utilized. Alternatively, as the negative electrode tab, a member different from the negative electrode current collector may be used.

The negative electrode may be formed, for example, as described below.

First, a negative electrode active material, a conductive agent, and a binder are dispersed in a widely used solvent, for example, N-methylpyrrolodone, to prepare slurry for producing a negative electrode.

When the slurry is prepared, it is preferable to set a combination ratio of the negative electrode active material, the conductive agent, and the binder to range of, respectively, 70% by mass to 96% by mass, 2% by mass to 20% by mass, and 2% by mass to 10% by mass. When the content of the conductive agent is adjusted to 2% by mass or more, the current collection property of the negative electrode material layer can be improved. When the content of the binder is adjusted to 1% by mass or more, the binding property between the negative electrode material layer and the negative electrode current collector can be increased, whereby an excellent cycle property can be expected. On the other hand, when the contents of the conductive agent and the binder are each adjusted to 16% by mass or less, the capacity can be preferably made larger.

The slurry obtained as above is applied on the negative electrode current collector. After that, the slurry applied on the negative electrode current collector is dried, and then is pressed, for example, using a roll press.

Thus, the negative electrode including the negative electrode current collector and the negative electrode material layer formed on the negative electrode current collector can be obtained.

The positive electrodes and the negative electrodes can form an electrode group. In the electrode group, the positive electrode material layer and the negative electrode material layer can face each other, for example, through a separator sandwiched between them.

The electrode group may have a so-called laminate structure in which the positive electrodes, the separators, and the negative electrodes are laminated. Alternatively, the electrode group may also have a so-called wound structure in which an assembly formed by laminating the positive electrode, the separator, and the negative electrode is spirally wound.

The separator is not particularly limited so long as it has an insulation property, and a porous film of a nonwoven fabric formed of a polymer such as a polyolefin, cellulose, polyethylene terephthalate, and vinylon may be used. The separator material may be used alone, or as a combination of two or more kinds.

The nonaqueous electrolyte may be held in the electrode group. The nonaqueous electrolyte may include a nonaqueous solvent and an electrolyte salt dissolved in the nonaqueous electrolyte. As the electrolyte salt, for example, $LiPF_6$, $LiBF_4$, $LiClO_4$, and the like may be used. As the nonaqueous solvent, for example, propylene carbonate (PC), ethylene carbonate (EC), 1,2-dimethoxyethane (DME), γ-butyrolactone (GBL), tetrahydrofuran (THF), 2-methyltetrahydrofuran (2-MeHF), 1,3-dioxolane, sulfolane, acetonitrile (AN), diethyl carbonate (DEC), dimethyl carbonate (DMC), or methylethyl carbonate (MEC) may be used.

The nonaqueous electrolyte battery according to the embodiment may further include a container housing the electrode group and the nonaqueous electrolyte.

For the container, for example, aluminum, an aluminum alloy, iron (Fe), iron plated with nickel (Ni), stainless steel (SUS), or the like may be used.

Alternately, the container may be a laminate film formed from a metal foil formed of the metal described above and a resin film.

The container may have various shapes in accordance with the use of the nonaqueous electrolyte battery according to the embodiment, and is not particularly limited.

The container may include a positive electrode terminal and a negative electrode terminal. The container itself can serve as either the positive electrode terminal or the negative electrode terminal. The positive electrode terminal can be electrically connected to the positive electrode tab of the positive electrodes included in the electrode group. The negative electrode terminal can be electrically connected to the negative electrode tab of the negative electrodes included in the electrode group.

A positive electrode lead may be connected between the positive electrode terminal and the positive electrode tab. Similarly, a negative electrode lead may be connected between the negative electrode terminal and the negative electrode tab.

It is desirable that the positive electrode terminal, the negative electrode terminal, the positive electrode lead, and the negative electrode lead are formed from, for example, aluminum or an aluminum alloy.

Next, one example of the nonaqueous electrolyte battery according to the embodiment is described, referring to FIG. 1 and FIG. 2.

FIG. 1 is a schematic cross-sectional view showing one example of nonaqueous electrolyte batteries according to the embodiment. FIG. 2 is an enlarged cross-sectional view showing a part A of the nonaqueous electrolyte battery shown in FIG. 1.

The nonaqueous electrolyte battery 10 shown in FIG. 1 includes a container 1 and an electrode group 2 housed in the container 1.

The container 1 is bag-shaped. The container 1 is a container formed of a laminate film.

The electrode group 2 includes, as shown in FIG. 2, a positive electrode 3, a negative electrode 4, and multiple separators 5. The electrode group 2 has, as shown in FIG. 2, a structure in which a laminate is spirally wound. The laminate has a structure in which the separator 5, the positive electrode 3, the separator 5, and the negative electrode 4 are stacked in this order. The wound electrode group 2 can be produced by spirally winding the laminate so that the negative electrode 4 being positioned as the outermost periphery, pulling out a core for winding, and then pressing it while it is heated.

As shown in FIG. 2, the positive electrode 3 includes a belt-shaped positive electrode current collector 3a, and positive electrode material layers 3b formed on both sides of the positive electrode current collector 3a. The positive electrode current collector 3a includes a positive electrode material-non-supporting part, where the positive electrode material layer 3b is not formed on the surface, (not shown) in the vicinity of the outermost periphery of the electrode group 2.

As shown in FIG. 2, the negative electrode 4 includes a belt-shaped negative electrode current collector 4a, and negative electrode material layers 4b formed on both sides of the negative electrode current collector 4a. The negative electrode current collector 4a includes a negative electrode material-non-supporting part, where the negative electrode material layer 4b is not formed on the surface, (not shown), in the vicinity of the outermost periphery of the electrode group 2.

The positive electrode terminal 6 shown in FIG. 1 is electrically connected to the positive electrode material-non-supporting part of the positive electrode 3. Similarly, the negative electrode terminal 7 shown in FIG. 1 is electrically connected to the negative electrode material-non-supporting part of the negative electrode 4. The connections can be performed, for example, by ultrasonic welding. The positive electrode terminal 6 and the negative electrode terminal 7 extend outward from the container 1.

A nonaqueous electrolyte (not shown in the views) is further housed inside the container 1. The nonaqueous electrolyte is held in the electrode group 2.

In the nonaqueous electrolyte battery according to the embodiment described above, the ratio of the occupancy area of the first conductive agent to the occupancy area of the positive electrode active material is from 1.5 to 5, in the mapping image of the components of the positive electrode material layer, and thus the first conductive agent is uniformly distributed around the positive electrode active material. The nonaqueous electrolyte battery according to the embodiment, therefore, can exhibit a high energy density and excellent cycle property.

EXAMPLE

Examples are described below, but the present invention is not limited to the Examples described below without departing from the gist of the present invention.

Example 1

In Example 1, a nonaqueous electrolyte battery 10 which was the same as that shown in FIG. 1 and FIG. 2 was produced in a method described below.

[Production of Positive Electrode 3]

A lithium-containing nickel-cobalt-manganese composite oxide, $LiNi_{0.6}Co_{0.2}Mn_{0.2}O_2$, as the positive electrode active material, acetylene black as the first conductive agent, graphite as the second conductive agent, and polyvinylidene fluoride as the binder were provided.

When the acetylene black prepared was subjected to Raman measurement, it was found that, in the obtained Raman chart, a first peak appeared at around 1350 cm$^{-1}$, a second peak appeared at around 1590 cm$^{-1}$, and a ratio of the integrated intensity of the first peak to the integrated intensity of the second peak was 0.8.

When graphite, which was the same graphite as the prepared graphite, was subjected to Raman measurement, it was found that, in a Raman chart obtained, a first peak appeared at around 1350 cm$^{-1}$, a second peak appeared at around 1590 cm$^{-1}$, and the ratio of the integrated intensity of the first peak to the integrated intensity of the second peak was 0.49.

The positive electrode active material, the acetylene black, the graphite, and the polyvinylidene fluoride prepared were placed in a bead mill disperser, a bead wet fine particle dispersion pulverizer "Sand Grinder" manufactured by AIMEX Co., Ltd., in a weight ratio of 87:5:3:5 together with a solvent, N-methylpyrrolodone.

In the bead mill disperser, glass beads having a diameter of 2 mm were used, the number of rotations of a blade was set to 800 rpm, and the dispersion was performed for 60 minutes. Thus, a positive electrode slurry was obtained.

The slurry obtained as above was uniformly applied on a positive electrode current collector 3a, which was a belt-shaped aluminum foil, while a part on which the slurry was not applied was left. After that, the slurry applied was dried, the obtained product was roll-pressed, and then it was cut into a desired size.

Thus, a positive electrode 3, including the positive electrode current collector 3a, and positive electrode material layers 3b formed on the positive electrode current collector 3a, was obtained.

To the part where the slurry was not applied of the positive electrode 3 obtained was welded a positive electrode terminal 6, formed from aluminum, by ultrasonic welding.

[Production of Negative Electrode 4]

Lithium titanate, $Li_4Ti_5O_{12}$, as the negative electrode active material, graphite as the conductive agent, and polyvinylidene fluoride as the binder were prepared. They were dissolved in a solvent, N-methylpyrrolodone, in a weight ratio of 85:10:5, and stirred to obtain a negative electrode slurry.

The slurry obtained as above was uniformly applied on a negative electrode current collector 4a, which was a belt-shaped aluminum foil, while a part on which the slurry was not applied was left. After that, the slurry applied was dried, the obtained product was roll-pressed, and then it was cut into a desired size.

Thus, a negative electrode 4, including the negative electrode current collector 4a, and negative electrode material layers 4b formed on the negative electrode current collector 4a, was obtained.

To the part where the slurry was not applied of the negative electrode 4 obtained was welded a negative electrode terminal 7, formed from aluminum, by ultrasonic welding.

[Production of Electrode Group 2]

Next, two polyethylene resin separators 5 were provided. Then, the separator 5, the positive electrode 3, the separator 5, and the negative electrode 4 were stacked in this order to form a laminate. Subsequently, the thus obtained laminate was spirally wound so that the negative electrode 4 was positioned as the outermost periphery, then a core for winding was pulled out, and it was pressed while it was heated. Thus, a wound electrode group 2 was produced.

[Production of Nonaqueous Electrolyte]

Next, a nonaqueous electrolyte was prepared. As the nonaqueous solvent, a mixture of ethylene carbonate and propylene carbonate in a volume ratio of 1:2 was used.

LiPF$_6$, as the electrolyte, was dissolved in the nonaqueous solvent in a concentration of 1.0 mol/L to prepare a nonaqueous electrolyte.

[Production of Nonaqueous Electrolyte Battery 10]

Next, a laminate film container 1, shown in FIG. 1, was provided. The electrode group 2 was housed in the container 1. At that time, the positive electrode terminal 6 and the negative electrode terminal 7 were extended outward from the container 1. Then, the nonaqueous electrolyte previously prepared was injected into the container 1 to hold it in the electrode group 2. After that, the container 1 was sealed to produce a nonaqueous electrolyte battery 10.

[Evaluation of Capacity Retention]

The nonaqueous electrolyte battery 10, whose initial capacity had been measured, was subjected to charge-and-discharge cycles. The charge-and-discharge cycle was repeated 400 cycles at a current corresponding to 2 C.

The capacity of the nonaqueous electrolyte battery 10 was measured after the cycle was repeated 400 cycles, and a capacity retention ratio after 400 cycles was calculated. The capacity retention ratio was 98% in Example 1.

[Acquisition of Mapping Image]

The positive electrode material layer 3b of the nonaqueous electrolyte battery 10 was subjected to Raman spectroscopy according to the method described above to obtain a Raman charts for 1600 points.

The Raman spectroscopy was performed under the following conditions.

Laser Source: Nd—YVO$_4$
Laser Wavelength: 532 nm (visible light)
Cumulative Number: one time
Exposure Time: 10 seconds
Lens: 50 magnifications
Measurement Range: 50 μm×50 μm
Standard Sample: Si crystals (having a peak at 519.5 to 521.5 cm$^{-1}$)

One of the obtained Raman charts is shown in FIG. 3. The chart shown in FIG. 3 had sharp peaks at around 1350 cm$^{-1}$ and around 1590 cm$^{-1}$, a peak top at around 570 cm$^{-1}$, and a broad peak over a range of 400 to 650 cm$^{-1}$.

Each component spectrum was obtained using the Raman charts for 1600 points according to the method described above. As a result, it was confirmed that the positive electrode material layer 3b had a first component which showed a first peak appeared at around 1350 cm$^{-1}$ and a second peak appeared at around 1590 cm$^{-1}$, a second component which showed a first peak appeared at around 1350 cm$^{-1}$ and a second peak appeared at around 1590 cm$^{-1}$, and a third component which showed a peak a top of which appeared at around 570 cm$^{-1}$.

Here, because the ratio of the integrated intensity of the first peak to the integrated intensity of the second peak in the first component was 0.8, the first component was identified as acetylene black. In addition, because the ratio of the integrated intensity of the first peak to the integrated intensity of the second peak in the second component was 0.49, the second component was identified as graphite. Further, because the third component had a peak top at around 570 cm$^{-1}$ and the broad peak over the range of 400 to 650 cm$^{-1}$, the third component was identified as a lithium-containing nickel-cobalt-manganese composite oxide.

Furthermore, according to the method described above, mapping images of the components of the positive electrode material layer 3b were obtained using the obtained Raman charts for 1600 points. Parts of the obtained mapping images of the components are shown in each FIG. 4 to FIG. 6.

Figure 4:
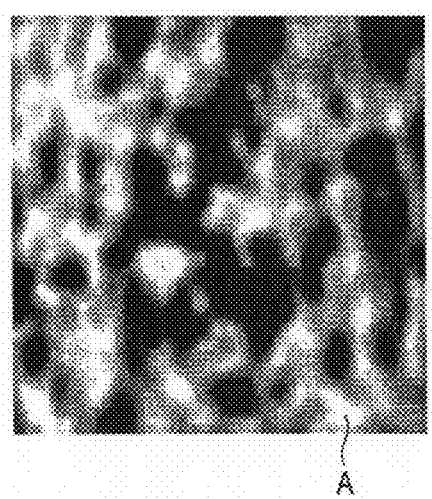
FIG. 4 is a Raman mapping image of a positive electrode active material in the positive electrode material layer in the nonaqueous electrolyte battery from Example 1.

FIG. 4 is a Raman mapping image of the positive electrode active material. In FIG. 4, an area having a high brightness, depicted by a letter A, shows existence of the lithium-containing nickel-cobalt-manganese composite oxide, which is the positive electrode active material.

Figure 5:
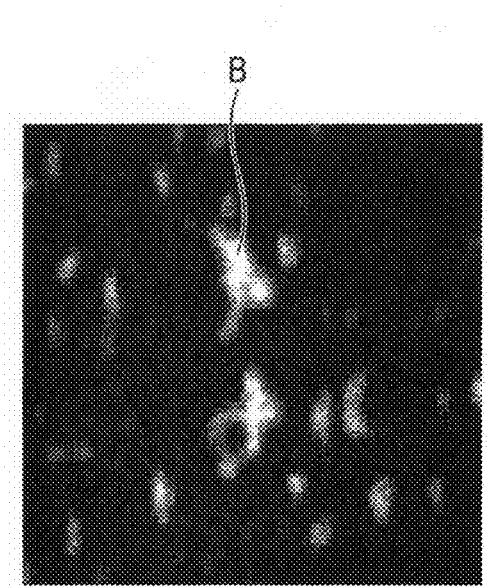
FIG. 5 is a Raman mapping image of acetylene black in the positive electrode material layer in the nonaqueous electrolyte battery from Example 1.

FIG. 5 is a Raman mapping image of acetylene black. In FIG. 5, an area having a high brightness, depicted by B, shows existence of acetylene black.

Figure 6:
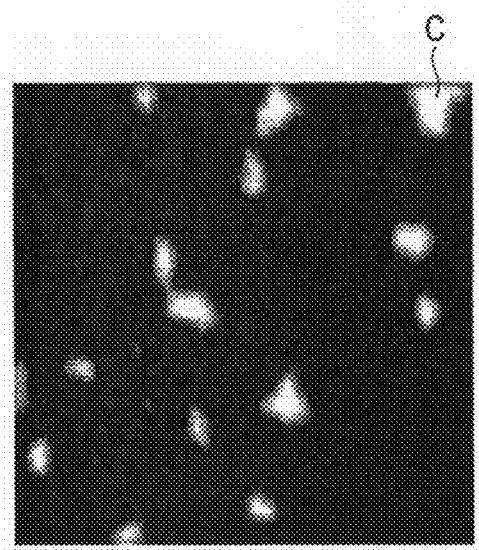
FIG. 6 is a Raman mapping image of graphite in the positive electrode material layer in the nonaqueous electrolyte battery from Example 1.

FIG. 6 is a Raman mapping image of graphite. In FIG. 6, an area having a high brightness, depicted by C, shows existence of graphite.

Note that, FIG. 4 to FIG. 6 are each a mapping image of each component in the same point of the positive electrode material layer 3b.

From FIG. 4 and FIG. 5, it was found that in the positive electrode material layer 3b, the acetylene black was uniformly dispersed in the vicinity of the positive electrode active material. From FIG. 5 and FIG. 6, it was found that in the positive electrode material layer 3b, graphite was sandwiched among a plurality of the acetylene black particles.

From the obtained data of the mapping image of the components, according to the method described above, the ratio of the occupancy area of the acetylene black to the occupancy area of the positive electrode active material, and the ratio in the distance of particles of the positive electrode active material to the distance of particles of the acetylene black were calculated. For the nonaqueous electrolyte battery 10 of Example 1, the occupancy area ratio was 1.83, and the ratio in the distance of the particles was 1.03.

[Measurement of Energy Density of Positive Electrode 3]

The energy density of the positive electrode 3 was measured as described above.

Example 2

A nonaqueous electrolyte battery 10 of Example 2 was produced in the same manner as in Example 1, except that the bead mill dispersion conditions were changed to those described in Table 1.

As for the nonaqueous electrolyte battery 10 of Example 2, the capacity retention ratio and the mapping images of the components of the positive electrode material layer were obtained in the same manner as in Example 1. The capacity retention ratio, the occupancy area ratio, and the ratio in the distance of the particles for the nonaqueous electrolyte battery 10 of Example 2 are shown in Table 1 below.

The energy density of the positive electrode in the nonaqueous electrolyte battery of Example 2 was the same as that in Example 1.

Example 3

A nonaqueous electrolyte battery 10 of Example 3 was produced in the same manner as in Example 1, except that the bead mill dispersion conditions were changed to those described in Table 1.

As for the nonaqueous electrolyte battery 10 of Example 3, the capacity retention ratio and the mapping images of the components of the positive electrode material layer were obtained in the same manner as in Example 1. The capacity retention ratio, the occupancy area ratio, and the ratio in the distance of the particles for the nonaqueous electrolyte battery 10 of Example 3 are shown in Table 1 below.

The energy density of the positive electrode in the nonaqueous electrolyte battery of Example 3 was the same as that in Example 1.

Comparative Example 1

A nonaqueous electrolyte battery of Comparative Example 1 was produced in the same manner as in Example 1, except that the bead mill dispersion conditions were changed to those described in Table 1.

As for the nonaqueous electrolyte battery of Comparative Example 1, the capacity retention ratio and the mapping images of the components of the positive electrode material layer were obtained in the same manner as in Example 1. The capacity retention ratio, the occupancy area ratio, and the ratio in the distance of the particles for the nonaqueous electrolyte battery of Comparative Example 1 are shown in Table 1 below.

The energy density of the positive electrode in the nonaqueous electrolyte battery of Comparative Example 1 was the same as that in Example 1.

Comparative Example 2

A nonaqueous electrolyte battery of Comparative Example 2 was produced in the same manner as in Example 1, except that the bead mill dispersion conditions were changed to those described in Table 1.

As for the nonaqueous electrolyte battery of Comparative Example 2, the capacity retention ratio and the mapping images of the components of the positive electrode material layer were obtained in the same manner as in Example 1. The capacity retention ratio, the occupancy area ratio, and the ratio in the distance of the particles for the nonaqueous electrolyte battery of Comparative Example 2 are shown in Table 1 below.

The energy density of the positive electrode in the nonaqueous electrolyte battery of Comparative Example 2 was the same as that in Example 1.

Comparative Example 3

A nonaqueous electrolyte battery of Comparative Example 3 was produced in the same manner as in Example 1, except that the bead mill dispersion conditions were changed to those described in Table 1.

As for the nonaqueous electrolyte battery of Comparative Example 3, the capacity retention ratio and the mapping images of the components the positive electrode material layer were obtained in the same manner as in Example 1. The capacity retention ratio, the occupancy area ratio, and the ratio in the distance of the particles for the nonaqueous electrolyte battery of Comparative Example 3 are shown in Table 1 below.

The energy density of the positive electrode in the nonaqueous electrolyte battery of Comparative Example 3 was the same as that in Example 1.

Comparative Example 4

A nonaqueous electrolyte battery of Comparative Example 4 was produced in the same manner as in Example 1, except that the weight ratio of the lithium-containing nickel-cobalt-manganese composite oxide, the acetylene black, the graphite, and the polyvinylidene fluoride, which were placed in the bead mill disperser, was changed to 82:10:3:5, and that the bead mill dispersion conditions were changed to those described in Table 1.

As for the nonaqueous electrolyte battery of Comparative Example 4, the capacity retention ratio and the mapping images of the components of the positive electrode material layer were obtained in the same manner as in Example 1. The capacity retention ratio, the occupancy area ratio, and the ratio in the distance of the particles for the nonaqueous electrolyte battery of Comparative Example 4 are shown in Table 1 below.

The energy density of the positive electrode in the nonaqueous electrolyte battery of Comparative Example 4 was 93 when the energy density in Example 1 was defined as 100.

TABLE 1

| | Dispersion Conditions | | | Ratio of Occupancy Areas | Ratio in Distance of Particles | Capacity Retention Ratio % | Energy Density of Positive Electrode % (Relative value to that of Example 1 as a base of 100) |
|---|---|---|---|---|---|---|---|
| | Bead Diameter (mm) | Dispersion Duration (min.) | Number of Rotation (rpm) | | | | |
| Example 1 | 2 | 60 | 800 | 1.83 | 1.03 | 98 | 100 |
| Example 2 | 2 | 50 | 800 | 1.50 | 0.96 | 95 | 100 |
| Example 3 | 2 | 60 | 1000 | 5.00 | 1.05 | 96 | 100 |
| Comparative Example 1 | 3 | 5 | 500 | 0.16 | 0.64 | 80 | 100 |
| Comparative Example 2 | 2 | 10 | 500 | 0.78 | 0.88 | 80 | 100 |
| Comparative Example 3 | 3 | 5 | 200 | 0.10 | 0.50 | 80 | 100 |
| Comparative Example 4 | 3 | 50 | 500 | 5.50 | 0.95 | 95 | 93 |

<Results>

From Table 1, it is found that the nonaqueous electrolyte batteries 10 from Example 1 to Example 3 had a more excellent capacity retention ratio than those of the nonaqueous electrolyte batteries from Comparative Examples 1 to 3. This is probably because, as one factor, in the nonaqueous electrolyte batteries 10 from Example 1 to Example 3, the acetylene black was uniformly dispersed around the positive electrode active material, because the ratio of the occupancy area of the acetylene black to the occupancy area of the positive electrode active material is from 1.5 to 5 in the mapping images of the components of the positive electrode material layer.

On the other hand, it can be considered that, in Comparative Examples 1 to 3, the acetylene black unevenly dispersed in the positive electrode material layer 3b and the acetylene black was not uniformly dispersed around the positive electrode active material, because the occupancy area is less than 1.5, and thus a deviation in the resistance distribution is caused in the positive electrode material layer, thus resulting in a decreased battery capacity.

From Table 1, it also is found that the nonaqueous electrolyte battery 10 from Example 1 had an energy density of the positive electrode higher than that in the nonaqueous electrolyte battery from Comparative Example 4. It can be considered that, in Comparative Example 4, the energy density of the positive electrode was decreased, because the occupancy area ratio was higher than 5.

Example 4

A nonaqueous electrolyte battery 10 of Example 4 was produced in the same manner as in Example 1, except that a lithium-containing nickel-cobalt-manganese composite oxide, $LiNi_{0.5}Co_{0.2}Mn_{0.3}O_2$ was used as the positive electrode active material.

As for the nonaqueous electrolyte battery 10 of Example 4, the capacity retention ratio and the mapping images of the components of the positive electrode material layer were obtained in the same manner as in Example 1. The capacity retention ratio, the occupancy area ratio, and the ratio in the distance of the particles for the nonaqueous electrolyte battery 10 of Example 4 are shown in Table 2 below.

The energy density of the positive electrode in the nonaqueous electrolyte battery of Comparative Example 4 was 98 when the energy density in Example 1 was defined as 100.

Example 5

A nonaqueous electrolyte battery 10 of Example 5 was produced in the same manner as in Example 1, except that carbon black was used as the first conductive agent.

The carbon black, which was the same carbon black as used in Example 5, was subjected to Raman measurement. As result, it was found that, in a Raman chart obtained, a first peak appeared at around 1350 $cm^{-1}$, a second peak appeared at around 1590 $cm^{-1}$, and the ratio of the integrated intensity of the first peak to the integrated intensity of the second peak was 1.06.

As for the nonaqueous electrolyte battery 10 of Example 5, the capacity retention ratio and the mapping images of the components of the positive electrode material layer were obtained in the same manner as in Example 1. The capacity retention ratio, the occupancy area ratio, and the ratio in the distance of the particles for the nonaqueous electrolyte battery 10 of Example 5 are shown in Table 2 below.

The energy density of the positive electrode in the nonaqueous electrolyte battery of Example 5 was the same as that in Example 1.

From the obtained Raman charts of the positive electrode material layer 3b in the nonaqueous electrolyte battery 10 from Example 5, it was found that the positive electrode material layer 3b in the nonaqueous electrolyte battery 10 from Example 5 included a first component in which the ratio of the integrated intensity of a first peak appearing at around 1350 $cm^{-1}$ to the integrated intensity of a second peak appearing at around 1590 $cm^{-1}$ was 1.06. For that reason, the first component was identified as carbon black.

Example 6

A nonaqueous electrolyte battery 10 of Example 6 was produced in the same manner as in Example 1, except that carbon black was used as the first conductive agent.

The carbon black, which was the same carbon black as used in Example 6, was subjected to Raman measurement. As result, it was found that, in a Raman chart obtained, a first peak appeared at around 1350 $cm^{-1}$, a second peak appeared at around 1590 $cm^{-1}$, and the ratio of the integrated intensity of the first peak to the integrated intensity of the second peak was 0.73.

As for the nonaqueous electrolyte battery 10 of Example 6, the capacity retention ratio and the mapping images of the components of the positive electrode material layer were obtained in the same manner as in Example 1. The capacity retention ratio, the occupancy area ratio, and the ratio in the distance of the particles for the nonaqueous electrolyte battery 10 of Example 6 are shown in Table 2 below.

The energy density of the positive electrode in the nonaqueous electrolyte battery of Example 6 was the same as that in Example 1.

From the obtained Raman chart of the positive electrode material layer 3b in the nonaqueous electrolyte battery 10 from Example 6, it was found that the positive electrode material layer 3b in the nonaqueous electrolyte battery 10 from Example 6 included a first component in which the ratio of the integrated intensity of a first peak appearing at around 1350 $cm^{-1}$ to the integrated intensity of a second peak appearing at around 1590 $cm^{-1}$ was 0.73. For that reason, the first component was identified as carbon black.

Example 7

A nonaqueous electrolyte battery 10 of Example 7 was produced in the same manner as in Example 1, except that graphene was used as the second conductive agent.

The graphene, which was the same graphene as used in Example 7, was subjected to Raman measurement. As result, it was found that, in a Raman chart obtained, a first peak appeared at around 1350 $cm^{-1}$, a second peak appeared at around 1590 $cm^{-1}$, and the ratio of the integrated intensity of the first peak to the integrated intensity of the second peak was 0.214.

As for the nonaqueous electrolyte battery 10 of Example 7, the capacity retention ratio and the mapping images of the components the positive electrode material layer were obtained in the same manner as in Example 1. The capacity retention ratio, the occupancy area ratio, and the ratio in the distance of the particles for the nonaqueous electrolyte battery 10 of Example 7 are shown in Table 2 below.

The energy density of the positive electrode in the nonaqueous electrolyte battery of Example 7 was the same as that in Example 1.

From the obtained Raman chart of the positive electrode material layer 3b in the nonaqueous electrolyte battery 10 from Example 7, it was found that the positive electrode material layer 3b in the nonaqueous electrolyte battery 10 from Example 7 included a second component in which the ratio of the integrated intensity of a first peak appearing at around 1350 $cm^{-1}$ to the integrated intensity of a second peak appearing at around 1590 $cm^{-1}$ was 0.214. For that reason, the second component was identified as graphene.

Example 8

A nonaqueous electrolyte battery 10 of Example 8 was produced in the same manner as in Example 1, except that graphite was used as the second conductive agent.

The graphite, which was the same graphite as used in Example 8, was subjected to Raman measurement. As result, it was found that, in a Raman chart obtained, a first peak appeared at around 1350 $cm^{-1}$, a second peak appeared at around 1590 $cm^1$, and the ratio of the integrated intensity of the first peak to the integrated intensity of the second peak was 0.23.

As for the nonaqueous electrolyte battery 10 of Example 8, the capacity retention ratio and the mapping images of the components of the positive electrode material layer were obtained in the same manner as in Example 1. The capacity retention ratio, the occupancy area ratio, and the ratio in the distance of particles for the nonaqueous electrolyte battery 10 of Example 8 are shown in Table 2 below.

The energy density of the positive electrode in the nonaqueous electrolyte battery of Example 8 was the same as that in Example 1.

From the obtained Raman chart of the positive electrode material layer 3b in the nonaqueous electrolyte battery 10 from Example 8, it was found that the positive electrode material layer 3b in the nonaqueous electrolyte battery 10 from Example 8 included a second component in which the ratio of the integrated intensity of a first peak appearing at around 1350 $cm^{-1}$ to the integrated intensity of a second peak appearing at around 1590 $cm^{-1}$ was 0.23. For that reason, the second component was identified as graphite.

TABLE 2

|  | Dispersion Conditions | | | | | Capacity Retention Ratio % | Energy Density of Positive Electrode % (Relative value to that of Example 1 as a base of 100) |
| --- | --- | --- | --- | --- | --- | --- | --- |
|  | Bead Diameter (μm) | Dispersion Duration (min.) | Number of Rotation (rpm) | Ratio of Occupancy Areas | Ratio in Distance of Particles | | |
| Example 4 | 2 | 60 | 800 | 3.24 | 1.08 | 98 | 98 |
| Example 5 | 2 | 60 | 800 | 1.65 | 0.95 | 97 | 100 |
| Example 6 | 2 | 60 | 800 | 1.83 | 1.02 | 98 | 100 |
| Example 7 | 2 | 60 | 800 | 2.10 | 1.00 | 97 | 100 |
| Example 8 | 2 | 60 | 800 | 1.85 | 1.00 | 98 | 100 |

From Table 1 and Table 2, it is found that the nonaqueous electrolyte batteries 10 from Example 4 to Example 8 had a more excellent capacity retention than those of the nonaqueous electrolyte battery from Comparative Examples 1 to 3, similarly to the nonaqueous electrolyte batteries 10 from Example 1 to Example 3. This is believed to be because, as one factor, in the nonaqueous electrolyte batteries 10 from Example 4 to Example 8, the first conductive agent was uniformly dispersed around the positive electrode active material, because the ratio of the occupancy area of the acetylene black to the occupancy area of the positive electrode active material is from 1.5 to 5 in the mapping images of the components of the positive electrode material layer.

From the results of Example 1 and Example 4, it is found that though the nonaqueous electrolyte batteries 10 from Example 1 and Example 4 were different in the positive electrode active material from each other, they exhibited both an excellent capacity retention ratio and high energy density of the positive electrode.

From the results of Example 1, Example 5, and Example 6, it is found that though the nonaqueous electrolyte batteries 10 from Example 1, Example 5 and Example 6 were different in the first conductive agent in the positive electrode material layer from each other, they all exhibited an excellent capacity retention ratio and high energy density of the positive electrode. This is because the first conductive agents in the nonaqueous electrolyte batteries 10 from Example 1, Example 5, and Example 6 were all conductive agents whose ratio of the integrated intensity of the first peak to the integrated intensity of the second peak was more than 0.6 and not more than 10 in the Raman chart.

From the results of Example 1, Example 7 and Example 8, it is found that though the nonaqueous electrolyte batteries 10 from Example 1, Example 7, and Example 8 were different in the first conductive agent in the positive electrode material layer from each other, they all exhibited an excellent capacity retention ratio and high energy density of the positive electrode. This is because the second conductive agents in the nonaqueous electrolyte batteries 10 from Example 1, Example 7, and Example 8 were all conductive agents whose ratio of the integrated intensity of the first peak to that of the second peak was more than 0 and not more than 0.6 in the Raman chart.

In the nonaqueous electrolyte battery according to at least one embodiment and Example described above, the ratio of the occupancy area of the first conductive agent to the occupancy area of the positive electrode active material is from 1.5 to 5 in the mapping image of the components of the positive electrode material layer, and thus the first conductive agent is uniformly dispersed around the positive electrode active material. For that reason, the nonaqueous electrolyte battery according to the embodiment can exhibit a high energy density and excellent cycle property.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a positive electrode comprising a positive electrode current collector and a positive electrode material layer formed on the positive electrode current collector, the positive electrode material layer comprising a positive electrode active material in an amount of 75-96% by mass based on the positive electrode material layer and a first conductive agent, the first conductive agent comprising a D-band appearing at $1350\pm10$ cm$^{-1}$ and a G-band appearing at $1590\pm10$ cm$^{-1}$ in a Raman chart obtained according to Raman spectroscopy, a ratio of an integrated intensity of the D-band to an integrated intensity of the G-band being more than 0.6 and not more than 10, and a ratio of an occupancy area of the first conductive agent to an occupancy area of the positive electrode active material being from 1.5 to 5 in a mapping image obtained according to Raman spectroscopy for the positive electrode material layer;
a negative electrode; and
a nonaqueous electrolyte.

2. The nonaqueous electrolyte battery according to claim 1, wherein, in the mapping image, a ratio of a distance of particles of the positive electrode active material to a distance between particles of the first conductive agent is from 0.9 to 1.1.

3. The nonaqueous electrolyte battery according to claim 1, wherein the ratio of the occupancy area of the first conductive agent to the occupancy area of the positive electrode active material is from 1.7 to 3.5.

4. The nonaqueous electrolyte battery according to claim 1, wherein the first conductive agent comprises at least one selected from the group consisting of carbon black, activated carbon, and carbon fiber.

5. The nonaqueous electrolyte battery according to claim 1, wherein the positive electrode material layer further comprises a second conductive agent; and
the second conductive agent comprises a D-band appearing at $1350\pm10$ cm$^{-1}$ and a G-band appearing at $1590\pm10$ cm$^{-1}$ in a Raman chart obtained according to Raman spectroscopy and a ratio of an integrated intensity of the D-band to an integrated intensity of the G-band is more than 0 and not more than 0.6.

6. The nonaqueous electrolyte battery according to claim 5, wherein the second conductive agent comprises at least one selected from the group consisting of graphite and graphene.

7. The nonaqueous electrolyte battery according to claim 1, wherein the positive electrode active material comprises $Li_yNi_{1-c-d}Co_cMn_dM_eO_2$, wherein $0.9 < y \leq 1.25$, $0 < c \leq 0.3$, $0 < d \leq 0.45$, and $0 \leq e \leq 0.1$, and M is at least one element selected from the group consisting of Mg, Al, Si, Ti, Zn, Zr, Ca, and Sn.

8. The nonaqueous electrolyte battery according to claim 1, wherein the positive electrode material layer further comprises a binder.

9. The nonaqueous electrolyte battery according to claim 8, wherein the binder comprises at least one selected from the group consisting of polytetrafluoroethylene, polyvinylidene fluoride, modified polyvinylidene fluoride, copolymers of vinylidene fluoride-hexafluoropropylene, and terpolymers of polyvinylidene fluoride-tetrafluoroethylene-hexafluoropropylene.

10. The nonaqueous electrolyte battery according to claim 1, wherein the negative electrode comprises a negative electrode current collector and a negative electrode material layer formed on the negative electrode current collector; and
the negative electrode material layer comprises a negative electrode active material.

11. The nonaqueous electrolyte battery according to claim 10, wherein the negative electrode active material comprises at least one selected from the group consisting of metals, metal alloys, metal oxides, metal sulfides, metal nitrides, graphitized materials, and carbonaceous materials.

12. The nonaqueous electrolyte battery according to claim 10, wherein the negative electrode active material comprises lithium titanate.

13. The nonaqueous electrolyte battery according to claim 3, wherein, in the mapping image, a ratio of a distance of particles of the positive electrode active material to a distance between particles of the first conductive agent is from 0.9 to 1.1.

* * * * *